US008879401B2

(12) United States Patent
Jocha et al.

(10) Patent No.: US 8,879,401 B2
(45) Date of Patent: Nov. 4, 2014

(54) LOSS MEASUREMENT FOR MULTICAST DATA DELIVERY

(75) Inventors: Dávid Jocha, Budapest (HU); János Farkas, Kecskemét (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 341 days.

(21) Appl. No.: 13/383,301

(22) PCT Filed: Jul. 10, 2009

(86) PCT No.: PCT/EP2009/058878
§ 371 (c)(1),
(2), (4) Date: May 24, 2012

(87) PCT Pub. No.: WO2011/003478
PCT Pub. Date: Jan. 13, 2011

(65) Prior Publication Data
US 2012/0320758 A1 Dec. 20, 2012

(51) Int. Cl.
*H04L 1/00* (2006.01)
*H04L 12/26* (2006.01)
*H04L 12/18* (2006.01)

(52) U.S. Cl.
CPC ......... *H04L 43/0835* (2013.01); *H04L 12/1863* (2013.01)
USPC .......................... 370/241.1; 370/241; 370/242

(58) Field of Classification Search
CPC ....... H04L 43/087; H04L 43/16; H04L 43/08; H04L 43/0811; H04L 43/0858; H04L 41/04; H04L 12/462; H04L 2012/5649
USPC .................. 370/252, 390, 352, 248, 241, 251
See application file for complete search history.

(56) References Cited

U.S. PATENT DOCUMENTS

2006/0092847 A1* 5/2006 Mohan ....................... 370/241.1
2009/0232005 A1 9/2009 Mohan et al.
(Continued)

FOREIGN PATENT DOCUMENTS

WO    WO 2008/050929 A1    5/2008

OTHER PUBLICATIONS

MEF 6.1, Technical Specification, Ethernet Services Definitions—Phase 2, Apr. 2008.
(Continued)

*Primary Examiner* — Andrew Lai
*Assistant Examiner* — Jamaal Henson
(74) *Attorney, Agent, or Firm* — Baker Botts, LLP

(57) ABSTRACT

A method of measuring loss in a multicast transmission in a network is described. Service frames including a service multicast destination address are sent from a source node towards a receiving node. A counter of the number of service frames sent is maintained at the source node. This counter is periodically read, and its value copied into a loss measurement OAM frame. The loss measurement OAM frame includes a unique identifier and an OAM destination address which is different to the service multicast destination address, and is sent from the source node towards the receiving node. Every time the sent frames counter is read, a measurement indicator frame is also sent from the source node towards the receiving node. The measurement indicator frame includes the unique identifier so that it can be related to the loss measurement OAM frame. The measurement indicator frame also includes the service multicast destination address, although the measurement indicator frame is distinguishable from the service frames. The receiving node eventually receives the loss measurement OAM frame and the measurement indicator frame, and calculates the number of lost or delayed service frames by comparing the number of service frames received at the receiving node at the time the measurement indicator frame is received with the sent frames counter value contained in the loss measurement OAM frame. The calculation is only performed when the loss measurement OAM frame and measurement indicator frame having the same identifier have been received by the receiving node.

17 Claims, 4 Drawing Sheets

(56) References Cited

U.S. PATENT DOCUMENTS

| | | | |
|---|---|---|---|
| 2009/0232006 A1 | 9/2009 | Mohan et al. | |
| 2009/0234969 A1 | 9/2009 | Mohan et al. | |
| 2009/0310508 A1* | 12/2009 | Ou et al. | 370/253 |
| 2010/0020696 A1* | 1/2010 | Tung | 370/241 |
| 2010/0020698 A1* | 1/2010 | Kondo | 370/241.1 |
| 2010/0039943 A1* | 2/2010 | Ryoo et al. | 370/242 |

OTHER PUBLICATIONS

ITU-T, OAM Functions and Mechanisms for Ethernet Based Networks, Y.1731, Feb. 2008.

ITU-T, Ethernet Frame Transfer and Availability Performance, Y.1563, Jan. 2009.

IEEE, 802.1ah, Virtual Bridged Local Area Networks, Aug. 2008.

Christensen, M., et al., Considerations for Internet Group Management Protocol (IGMP) and Multicast Listener Discovery (MLD) Snooping Switches, Network Working Group, RFC 4541, May 2006.

International Search Report for PCT/EP2009/058878, mailed Mar. 25, 2010.

Dinesh Mohan Nortel Networks Canada: "Draft new Recommendation Y. 1731 (for consent) OAM Functions and Mechanisms for Ethernet based networks", *ITU-T Draft Study Period* 2005-2008, Int'l. Telecommunication Union, vol. Study Group 13, Jan. 16, 2006, pp. 1-80.

\* cited by examiner

LOSS MEASUREMENT FOR MULTICAST DATA DELIVERY

This application is the U.S. national phase of International Application No. PCT/EP2009/058878 filed 10 Jul. 2009 which designated the U.S., the entire contents of which is hereby incorporated by reference.

TECHNICAL FIELD

The present invention relates to loss measurement for data delivery in multicast transmissions. In particular, the invention relates to an exact loss measurement for Ethernet multicast connections.

BACKGROUND

Ethernet services are increasingly widely deployed, especially in metro networks. The Metro Ethernet Forum defines the basic Ethernet services to be supported by an Ethernet network, such as E-Line, E-Tree and E-LAN (MEF 6.1: "Metro Ethernet Services Definitions Phase 2" (April 2008)). E-Line is a point-to-point service; E-Tree is essentially a point-to-multipoint service; and E-LAN is a multipoint-to-multipoint service. E-Tree can be implemented by establishing a multicast transmission, and embedding users' data frames corresponding to a service ("service frames") in multicast frames in a metro region. E-LAN might be implemented as a set of multicast trees.

Operators of networks need to take measurements in order to monitor the performance of those networks. Operators typically prefer to implement passive measurements, which rely on counters: the service parameters are determined based on these counters. The counters are typically carried in Operation Administration Maintenance (OAM) frames instead of service frames, although OAM frames should travel the same path as service frames. This means that the users' service frames are not modified for measurement purposes.

Service parameter measurement is a key issue both for operators and their subscribers, in order to verify their agreements and to check whether the requirements for specific services are met. There are mature measurement methods defined for point-to-point services, which are typically established by unicast connections, defined for example in ITU-T Rec. Y.1731 (February 2008): "OAM functions and mechanisms for Ethernet based networks". Frame loss measurement methods are also defined in the same document. However, accurate frame loss measurement methods are not yet defined for multicast services, though the corresponding parameters have been recently defined in ITU-T Rec. Y.1563 (January 2009): "Ethernet frame transfer and availability performance".

Provider and customer networks are typically separated by full header encapsulation at the edge of the provider network. This is also essential for the proper operation of loss measurement because, if this were not the case, customer frames entering the provider network at different edge nodes would not be distinguishable. One possibility to implement encapsulation in an Ethernet network is described in IEEE 802.1ah: "Provider Backbone Bridges" (August 2008). Note, that instead of full header encapsulation, other methods could be applied, such as source address tables at the measurement point for IEEE 802.1ad.

FIG. 1 is a schematic illustration of a provider network 101, which uses this approach. The provider network 101 is bordered by Backbone Edge Bridges (BEB) 102, 103, 104, 105, 106, 107, and includes Backbone Core Bridges (BCB) 108, 109, 110 inside the network.

Measurements are invoked by Maintenance End Points (MEP), which reside in edge nodes of the network. In the example shown in FIG. 1, these edge nodes are the BEBs 102-107. Essentially, MEPs exchange OAM frames for the measurement of service parameters. Intermediate nodes such as BCBs 108, 109, 110 may include Maintenance Intermediate Points (MIP).

Point-to-multipoint services can be efficiently implemented in Ethernet networks by the usage of multicast frames. In a basic Ethernet network where there is no support for multicast frame forwarding, all multicast frames are sent to all bridges in the network, as the proper forwarding is not set for the multicast destination addresses. This operation is illustrated in FIG. 2, which shows the network 101 of FIG. 1.

As shown in FIG. 2, BEB1 102 is a source node of a multicast service; BEB2 103 and BEB3 104 are the recipients registered for the service. However, as FIG. 2 shows, every node receives the frames 201 corresponding to the multicast service if no protocol for multicast support is running in the network. This means that the service frames are received by the registered nodes BEB2 103 and BEB3 104, but also by the unregistered end nodes such as BEB4 105, BEB5 106 and BEB6 107. The unregistered end nodes BEB4 105, BEB5 106 and BEB6 107 therefore need to drop the frames they are not registered to receive. It will be appreciated the diagram is illustrative only, and there may be more than one subscription simultaneously active per destination. There may also be more than one source for any given multicast destination address.

There are two protocols specified for supporting multicast forwarding in an Ethernet network by directing multicast frames only towards addresses registered for the multicast service: the Multiple Registration Protocol (MMRP) (defined in IEEE 802.1ak) and Internet Group Management Protocol (IGMP) snooping (defined in IETF RFC 4541). If either of them is applied in the network then multicast frames are forwarded as illustrated in FIG. 3: the frames 301 corresponding to the service whose source is BEB1 102 are only forwarded to BEB2 103 and BEB3 104, which are the registered recipients for that service.

Any method that is applied for accurate loss measurement corresponding to a multicast service will depend on the forwarding scheme applied in the network, i.e. whether or not MMRP (or IGMP snooping) is applied.

There are currently no suitable multicast service frame loss measurement methods. It is desirable for exact loss measurement of multicast frames to be done on a three-tuple relation of the sender and multicast destination address and the receiving node.

Previous measurement systems such as that described in ITU-T Rec. Y.1731 (February 2008): "OAM functions and mechanisms for Ethernet based networks" have focussed only on the measurement of point-to-point performance parameters, leaving multipoint for further study. If such measurement systems are to be adapted to measure services in multipoint systems, there are several issues which must be solved in this case, as discussed below.

The document MEF 6.1 referred to above describes the measurement of the loss of synthetic OAM frames, but not the loss of service frames. With synthetic loss measurement the real loss of service frames can only be estimated: precise measurement is not possible.

Other existing documents such as WO 2008/050929 define a framework but provide no solution to any of the technical issues. The main proposal of WO 2008/050929 is that lost frames should be measured as the difference between incoming and outgoing frames. However, there is no solution proposed for problems arising when one wants to measure the loss for multicast traffic exactly. Such problems include:
- different address for service and OAM frames;
- consequences of using MMRP or IGMP snooping; and
- handling of dynamic changes in the registrations for a service.

OAM frames used for measurement typically contain counters containing a value obtained from corresponding counters maintained in the network nodes. For example, a "sent frames" counter maintained in the source node is read out and copied into the loss measurement OAM frame. The OAM frame thus carries a record of the number of service frames sent by the source node for a particular service. When the receiving node receives the OAM frame, it compares the counter with the number of service frames actually received. The difference between the two numbers should provide a measurement of the number of lost frames.

OAM destination addresses defined in ITU-T Rec. Y.1731 are not the same as the service multicast address. This means that there is a chance of reordering or that the service and OAM frames are forwarded on a different path. As a result of this, service frames sent after the counter readout may arrive before the loss measurement OAM frame containing the counter value, or service frames sent before the counter readout may arrive before the loss measurement OAM frame. This causes inaccuracy in the loss measurement.

Furthermore, unless IGMP snooping, MMRP or a similar method is used as shown in FIG. 3, multicast service frames are transmitted to all bridges in the network, regardless of whether the bridge is subscribed for the service, as illustrated in FIG. 2. Both cases raise issues.

If IGMP snooping or MMRP is not used, then all multicast frames reach all nodes. If a receiving node subscribes to the multicast service during a measurement period, the counter in the first loss measurement OAM frame received by the receiving node will account for some service frames sent before the receiving node subscribed to the service. These service frames will never be received by the receiving node and the first measurement after subscription will inevitably be inaccurate.

MMRP and IGMP snooping set the forwarding in intermediate nodes according to the subscription to a multicast service, and thus eliminate the forwarding of multicast service frames to unsubscribed nodes. They manipulate the forwarding for the service multicast destination address but do not contain any explicit information on the subscribed nodes.

If IGMP snooping or MMRP is used, even though no service frames reach unsubscribed nodes, the loss measurement OAM frames may still reach an unsubscribed node if the service and OAM destination addresses are different. In such a situation the loss measurement is very inaccurate at an unsubscribed node: the OAM frames contain the "sent frames" counter of the source, which includes all multicast frames sent out by the source for a particular service, and has the same value irrespective of the subscription by receiving nodes. If the receiving node is not subscribed it will never receive any of the corresponding service frames, and this results in a huge false loss value in the measurements. In other words, the filtering of service frames but not OAM frames due to MMRP or IGMP results in a continuous false positive loss when a receiving node is not subscribed. The first loss measurement immediately after subscription will also be inaccurate in just the same way as if MMRP or IGMP snooping is not deployed.

In addition, loss and delay measurement frames defined in ITU-T Rec. Y.1731 do not include an additional reference to the relationship for which the measurement is made. This is not a problem for point to point transmissions. However, it is a problem for multicast systems, where address measurements for each multicast are desired.

There is also a problem with reply frames under previously proposed systems. The loss and delay measurement reply frames defined in ITU-T Rec. Y.1731 are addressed to the unicast address of the root (source node), and are therefore able to measure leaf to root (destination to source) unicast point-to-point performance. They also contain information for the root about the root to leaf direction, which could be a point-to-multipoint multicast relation without extensions. Therefore multicast measurement reply frames containing unicast backward measurement information may result in confusion or contain redundant information compared to bidirectional unicast measurements.

SUMMARY

This invention proposes alternative solutions for exact loss measurement for Ethernet multicast transmissions depending on the forwarding approach used in the Ethernet network.

In accordance with one aspect of the present invention there is provided a method of measuring loss in a multicast transmission in a network. Service frames including a service multicast destination address are sent from a source node towards a receiving node. A counter of the number of service frames sent is maintained at the source node. This counter is periodically read, and its value copied into a loss measurement OAM frame. The loss measurement OAM frame includes a unique identifier and an OAM destination address which is different to the service multicast destination address, and is sent from the source node towards the receiving node. Every time the sent frames counter is read, a measurement indicator frame is also sent from the source node towards the receiving node. The measurement indicator frame includes the unique identifier so that it can be related to the loss measurement OAM frame. The measurement indicator frame also includes the service multicast destination address, although the measurement indicator frame is distinguishable from the service frames. The receiving node eventually receives the loss measurement OAM frame and the measurement indicator frame, and calculates the number of lost or delayed service frames by comparing the number of service frames received at the receiving node at the time the measurement indicator frame is received with the sent frames counter value contained in the loss measurement OAM frame. The calculation is only performed when the loss measurement OAM frame and measurement indicator frame having the same identifier have been received by the receiving node.

Thus a measurement indicator frame is inserted into the service frame flow whenever an OAM message is sent. The measurement indicator frame may provide an indication of the service frames between which it was sent.

The measurement indicator frame may be distinguishable from the service frames by being a different type of frame. For example, it could be an OAM Ethertype, or may have a new OAM message type.

The identifier may be a globally unique identifier. Alternatively, the identifier may be locally unique to a particular multicast service, in which case a multicast service address for the particular multicast service may be included in the loss measurement OAM message.

In accordance with another aspect of the present invention there is provided a method of measuring loss in a multicast transmission in a network. Service frames including a service multicast destination address are sent from a source node towards a receiving node. A counter of the number of service frames sent is maintained at the source node. This counter is periodically read, and its value copied into a loss measurement OAM frame. The loss measurement OAM frame (which includes the service multicast destination address) is sent from the source node towards the receiving node and received at the receiving node. At the receiving node, the number of lost or delayed service frames is calculated by comparing the number of service frames received at the receiving node with the counter value contained in the loss measurement OAM frame.

Thus in this aspect the service multicast address is used as the destination address of the OAM frames.

The calculation of the number of lost or delayed frames at the receiving node after receipt of the first loss measurement OAM frame after the receiving node subscribes to the multicast transmission may be suppressed. This suppression helps to eliminate the inaccuracy introduced by dynamic changes to the multicast forwarding topology through use of control protocols, such as MMRP and IGMP snooping.

The suppression may be achieved by the receiving node maintaining a received frames counter for recording the number of service frames received, and increasing said received frames counter to the counter value in the first loss measurement OAM frame received after subscription to the multicast service. Alternatively the receiving node may also maintain a correction counter. The correction counter may be updated based on the counter value in the first loss measurement OAM frame received after subscription to the multicast service, and added to the received frame counter when the loss is calculated.

In a further alternative, the loss may be reset to zero for the period in which the receiving node was not subscribed to the multicast transmission.

Instead of suppressing the first measurement, the receiving node may explicitly inform the source node when it subscribes to the multicast transmission, for example by extending the IGMP or MMRP protocol, or by an explicit unicast notification message.

A unicast loss reply message may be sent from the receiving node towards the source node. The unicast loss reply message may contain the results of the loss calculation but not counters to measure loss for packets travelling from the receiving node to the source node.

The network may be an Ethernet network.

In accordance with another aspect of the present invention there is described a bridge node for use in a network. The bridge node comprises a receiver for receiving multicast service frames, measurement indicator frames and loss measurement OAM frames from a source node in the network. The multicast service frames have a service multicast destination address. The measurement indicator frames also have the service multicast destination address, and the loss measurement OAM frames have an OAM destination address different to the service multicast destination address. A processor is operatively connected to the receiver for performing loss measurements. A memory is operatively connected to the processor for storing a received frames counter. The processor is arranged to count the number of received service frames and record this using the received frames counter. When a loss measurement OAM frame is received, the processor recovers a sent frames counter value from the loss measurement OAM frame. The sent frames counter indicates the number of frames sent by the source node. When a measurement indicator frame corresponding to the loss measurement OAM frame is received, the processor calculates a number of lost or delayed service frames by comparing the received frames counter value with the sent frames counter value.

In accordance with another aspect of the present invention there is provided a bridge node for use in a network. The bridge node comprises a receiver for receiving service frames and loss measurement OAM frames from a source node in the network in the same data flow. A processor is operatively connected to the receiver for performing loss measurements. A memory is operatively connected to the processor for storing a received frames counter. The processor is arranged to count the number of received service frames and record this using the received frames counter. When a loss measurement OAM frame is received, the processor recovers a sent frames counter value from the loss measurement OAM frame, and calculates the number of lost or delayed service frames by comparing the received frames counter value with the sent frames counter value.

The bridge node may also comprise a transmitter operatively connected to the processor for sending a unicast loss reply message towards the source node, the unicast loss reply message containing the results of the loss calculation but not counters to measure loss for packets travelling from the receiving node to the source node.

In accordance with another aspect of the present invention there is provided a bridge node for use in a network. The bridge node comprises a processor. A memory is operatively connected to the processor for storing a sent frames counter. A transmitter is operatively connected to the processor for sending multicast service frames towards a receiving node in the network, the service frames including a service multicast destination address. The processor is arranged to record the number of service frames sent using the sent frames counter. The processor periodically reads the sent frames counter from the memory, generates a loss measurement OAM frame having an OAM destination address different to the service multicast destination address and a unique identifier, and copies the sent frames counter into the loss measurement OAM frame. Each time a loss measurement OAM frame is generated, the processor also generates a measurement indicator frame having the service multicast destination address and the unique identifier. The transmitter is arranged to send the loss measurement OAM frame and measurement indicator frame towards the receiving node.

In accordance with another aspect of the present invention there is provided a bridge node for use in a network. The bridge node comprises a processor for performing loss measurements. A memory operatively connected to the processor for storing a sent frames counter; and a transmitter for sending multicast service frames towards a receiving node in the network, the service frames including a service multicast destination address;

wherein the processor is arranged:

to record the number of service frames sent using the sent frames counter; and periodically, to read the sent frames counter from the memory, generate a loss measurement OAM frame having the service multicast destination address, and copy the sent frames counter into the loss measurement OAM frame;

and wherein the transmitter is arranged to send the loss measurement OAM frame towards the receiving node.

DETAILED DESCRIPTION

Different approaches for frame forwarding for multicast services have been discussed above. Measurement is typically carried out using OAM frames, and this approach has the advantage that users' service frames need not be modified for measurement purposes.

In order to ensure that OAM frames are used correctly by a receiving nodes, and to solve the problem of measurement inaccuracy caused by the different destination address of the service and OAM frames, a new frame, hereinafter called a "Measurement Indicator frame", may be inserted into the flow of service frames corresponding to a multicast service. The usage of Measurement Indicator frames is illustrated in FIG. 4.

Figure 1:
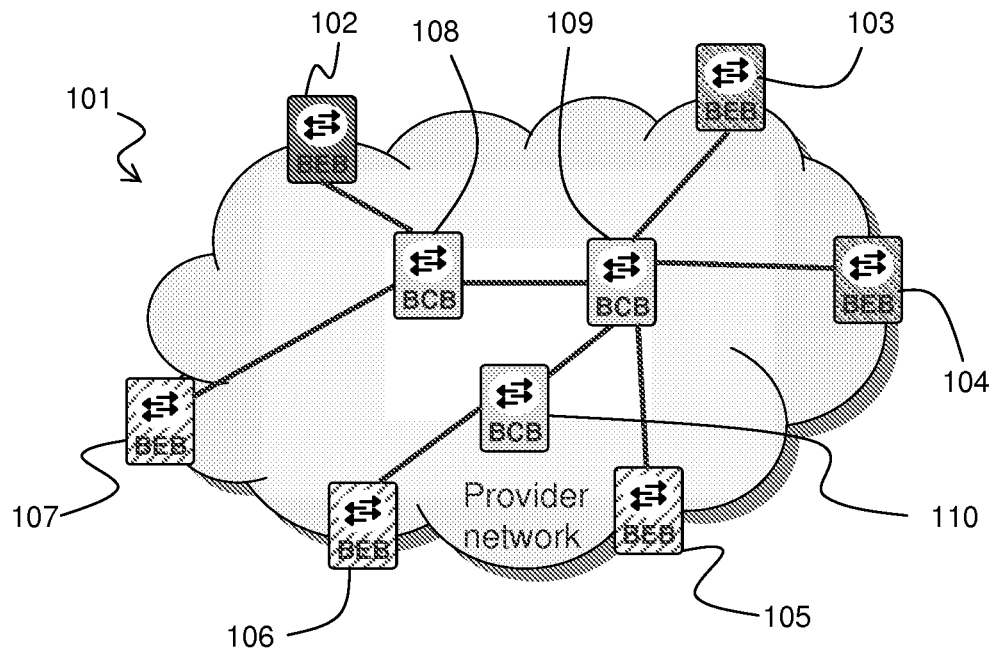
FIG. 1 is a schematic illustration of a provider network.
Figure 2:
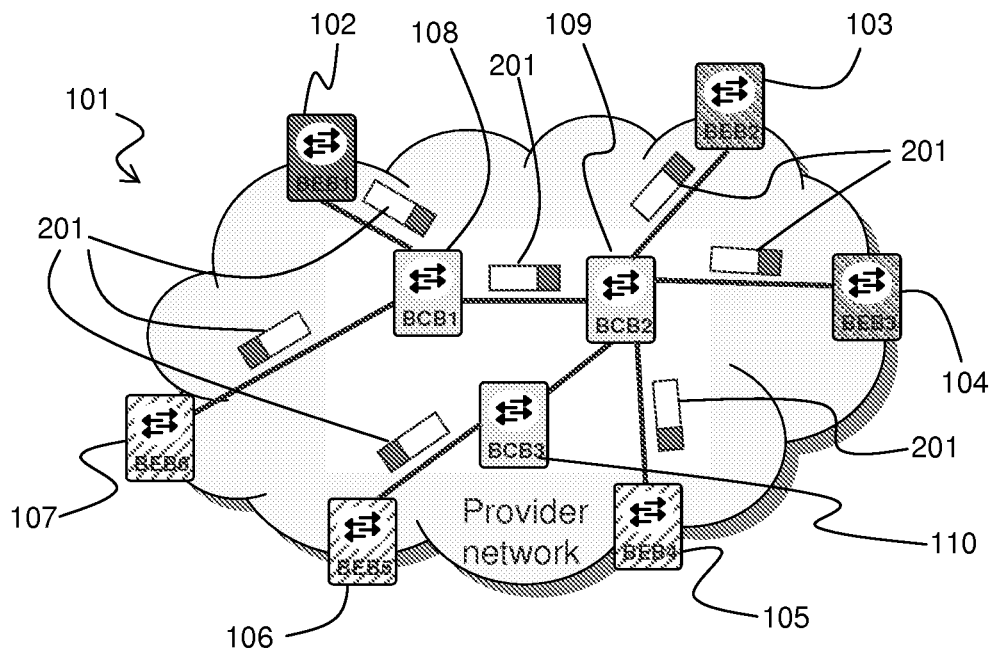
FIG. 2 is a schematic illustration of the provider network of FIG. 1 in which multicast frames are sent to all bridge nodes.
Figure 3:
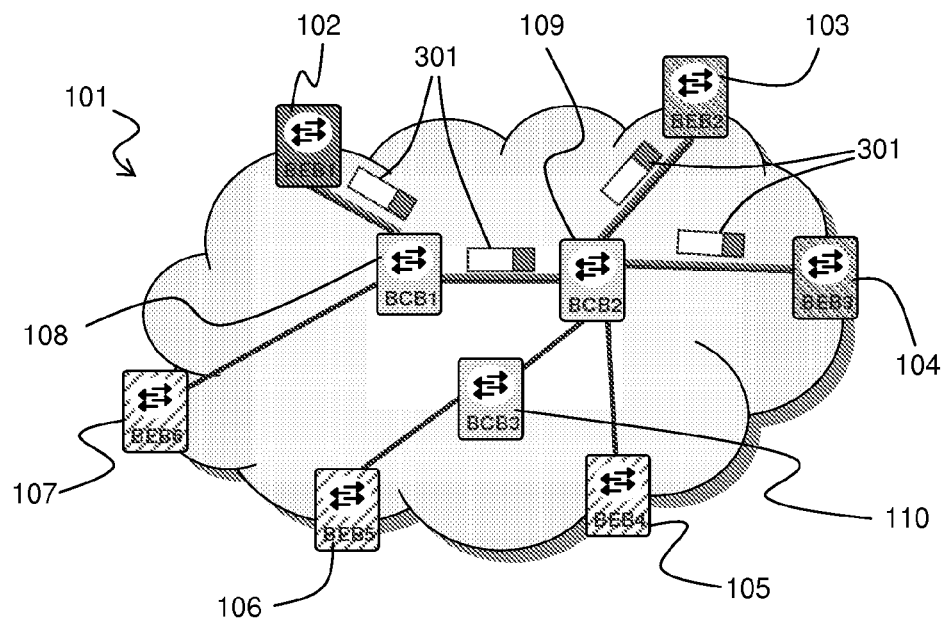
FIG. 3 is a schematic illustration of the provider network of FIG. 1 in which multicast frames are only directed towards addresses registered to the multicast service.
Figure 4:
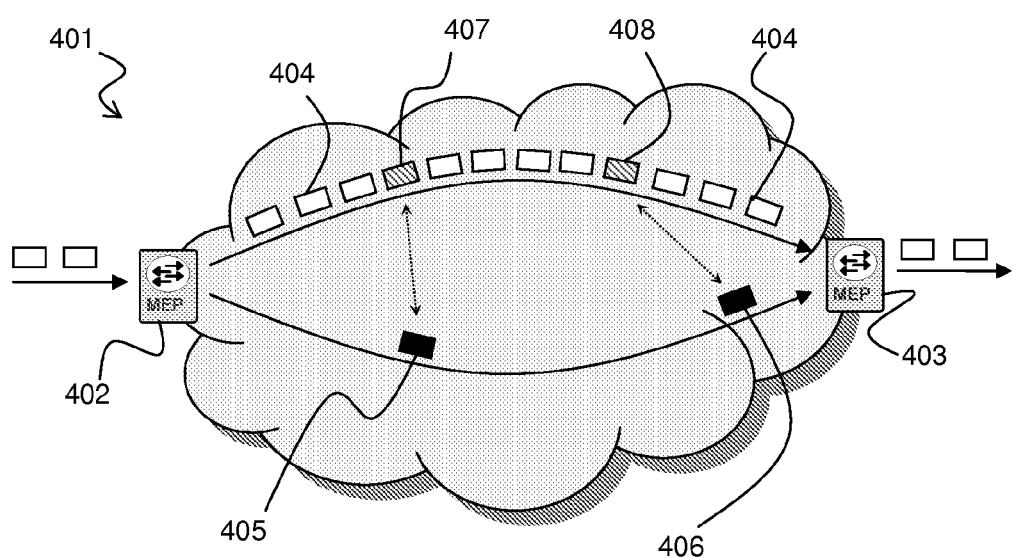
FIG. 4 is a schematic illustration of a provider network with measurement indicator frames inserted into the service frame flow.

FIG. 4 is a schematic illustration of a network 401, similar to the network 101 shown in FIGS. 1, 2 and 3, which includes Maintenance End Points (MEPs) 402, 403 at the edges of the network. Service frames 404 corresponding to a multicast service are sent from a source MEP 402 towards a receiving MEP 403. OAM frames 405, 406 are periodically issued by the source MEP 403, and may be forwarded in a different path from the service frames. Measurement Indicator frames 407, 408 are inserted into the flow of service frames.

Figure 6:
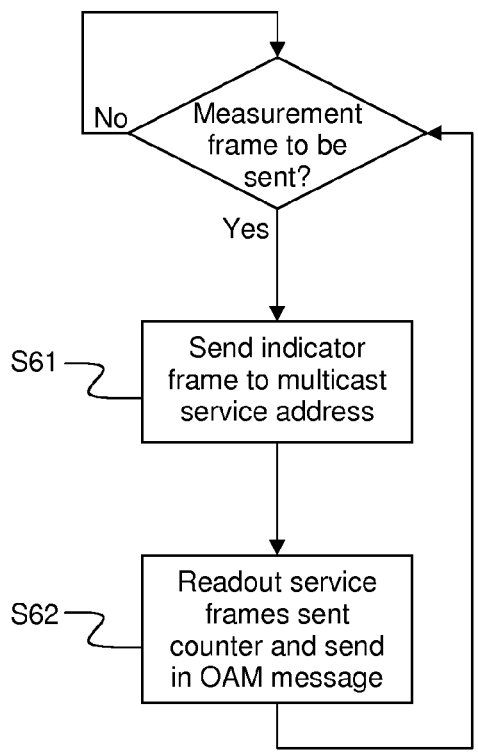
FIG. 6 is a flowchart indicating the actions taken by a source node in sending out loss measurement frames.

A Measurement Indicator frame 407, 408 is sent every time the counter at the source MEP 403 is read out and its value copied to the OAM frame 405 that is about to issue for loss measurement. The operation of the source MEP 402 is shown in a flow-chart in FIG. 6:

S61: Each time a measurement frame is to be sent, a measurement indicator frame 407 is sent towards the multicast service address.

S62: At the same time, the counter showing how many service frames have been sent is read out and copied into a loss measurement OAM message 405, which is then sent.

The Measurement Indicator frame shows the two service frames between which the counter was read out. One way of achieving this is for the Measurement Indicator frame 407, 408 to contain the sequence number of the service frames either side. The destination address of the Measurement Indicator frame 407, 408 is the same as the multicast service address, but the indicator frame has an OAM EtherType. Thus the Measurement Indicator frame is distinguishable from service frames despite having the same destination address as the service frames and being forwarded on the same path.

Each Measurement Indicator frame 407, 408 also contains a unique identifier, which is also carried in the corresponding measurement OAM frame 405, 406. Thus, a one-to-one association is established between each OAM frame 405, 406 and its corresponding Measurement Indicator frame 407, 408 which shows the time instance of the measurement counter read-out. For the receiving MEP 403, the evaluation of the OAM frame 405 becomes unambiguous because it should be evaluated only when the corresponding Measurement Indicator frame 407 has also been received. This ensures that the measurement is exact.

Figure 7:
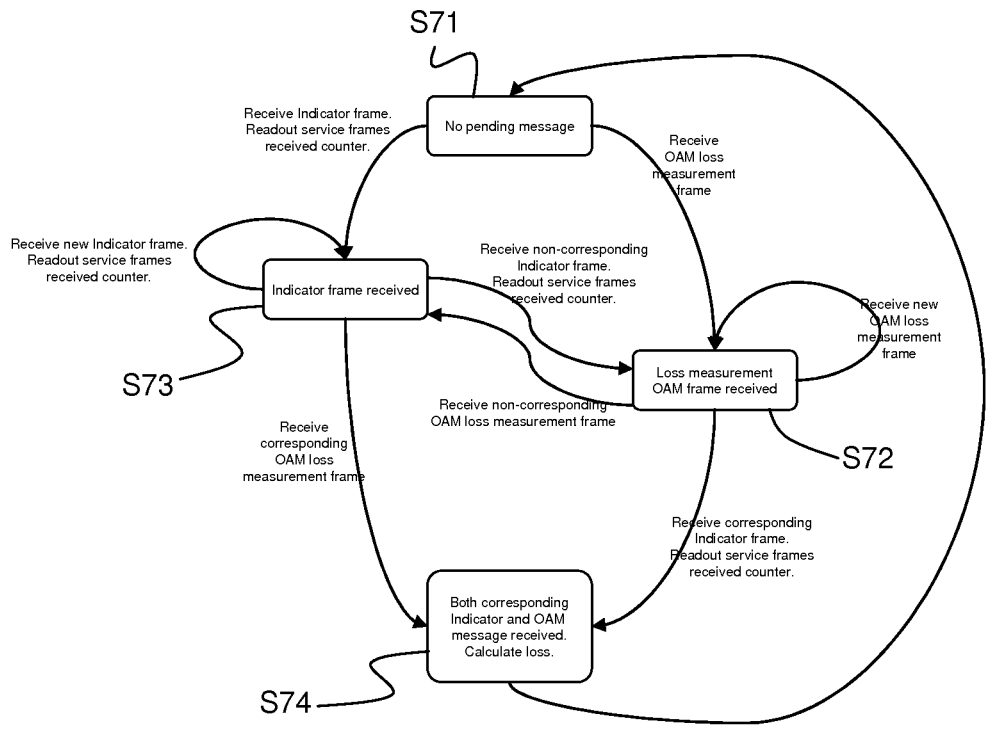
FIG. 7 is a state diagram illustrating the operation of a receiving node.

This can be understood with reference to FIG. 7, which is a state diagram illustrating the operation of the receiving MEP 403.

S71: Initially, it may be assumed that there is no pending message.

S72: Every time a loss measurement OAM frame 405, 406 is received, a check is made to see if a corresponding measurement indicator frame 407, 408 has been received.

S73: Every time a corresponding measurement indicator frame 407, 408 is received, a check is made to see if a corresponding loss measurement OAM frame 405, 406 has been received.

S74: A loss is calculated only when a matching pair of loss measurement OAM and measurement indicator frames have been received.

The unique identifier which confirms the association between loss measurement OAM and measurement indicator frames may be a globally unique identifier, or may be locally unique for each multicast service. In the second case the multicast service address is also sent together with the identifier in the loss measurement OAM message.

As previously discussed, the application of multicast frame forwarding optimization methods such as MMRP and IGMP snooping introduces inaccuracy to the loss measurement if the OAM frames and the service frames have different destination addresses. This inaccuracy can be avoided by "suppressing" these false loss measurements when the node is not subscribed to the specific multicast address. The source MEP 402 periodically sends OAM frames 405, 406 for loss measurement to the dedicated OAM destination address. These OAM frames are received by all nodes (both subscribed and unsubscribed) because MMRP and IGMP snooping only control the forwarding of service frames. When a node receives OAM frames relating to a multicast service to which the node is not subscribed, the loss measurement is simply not carried out.

The usage of MMRP or IGMP snooping also raises another issue, as discussed above. When subscribing (after an unsubscribed period), the first loss measurement will refer partially to an unsubscribed and partially to a subscribed period. Thus, the loss measurement becomes incorrect. In order to provide exact measurement result further counter manipulation is required in order to suppress this first loss measurement. It is desirable to modify existing calculation processes as little as possible, since they are usually already implemented.

In one approach, a "received frames" counter at the receiving node 403 is modified to show that all service frames have been received when the first OAM message is received after subscription is started. Therefore, the "received frames" counter value of the receiving node 403 is increased to the value of the counter in the received frame loss measurement OAM message.

In another approach a separate correction counter in the receiving MEP 403 is used. The correction counter is updated based on the counter in the first frame loss measurement OAM message received once subscription has started. The value of the correction counter is added to the received frames when the loss is calculated.

In another approach, no correction of the counters is required. Instead, when (or after) calculating the loss, the result is changed to a zero loss for the unsubscribed period.

Instead of suppressing false loss measurements, an alternative approach to solving the problems introduced by the use of MMRP or IGMP snooping involves informing the source MEP 402 about the membership status of the receiving MEP 403. The source MEP 402 is informed about the membership of the multicast group. This way the source MEP 402 always has an up-to-date list of the receiving nodes (e.g. MEP 403) actually subscribed to a specific multicast address to which the source node sends frames. This implies that a separate counter has to be maintained in the source MEP 402 and in the OAM frames for every destination/multicast address combination.

Informing the source MEP 402 is initiated by the receiving MEP 403, and could be done in one of a number of ways, including for example:

Option 1: Extending existing protocols, like IGMP or MMRP, to be able to convey multicast group membership information to the source node 402. This is not the planned behaviour of these protocols but such a solution could be implemented.

Option 2: Explicit membership notification from the receiving node. The receiving MEP 403 sends a unicast frame, containing its membership information, to the source MEP 402, immediately after receiving the first multicast service frame 404. The receiving MEP 402, having recently subscribed to the service, is able to determine the address to which the explicit notification is to be sent because it is the source address field of the received multicast service frame.

It will be noted that informing the source MEP of membership status could in some cases be carried out by the node performing the multicast frame filtering (e.g. IGMP snooping).

The discussion above has focussed on the situation in which OAM frames are sent to different addresses to service frames, since this is the practice in current standards for point-to-point OAM. The destination address of OAM frames is generally either a unicast address or a standardized multicast address. An alternative approach which achieves exact measurement is to change the OAM addressing: the destination address of the OAM frames can be the same as the multicast service address.

Figure 5:
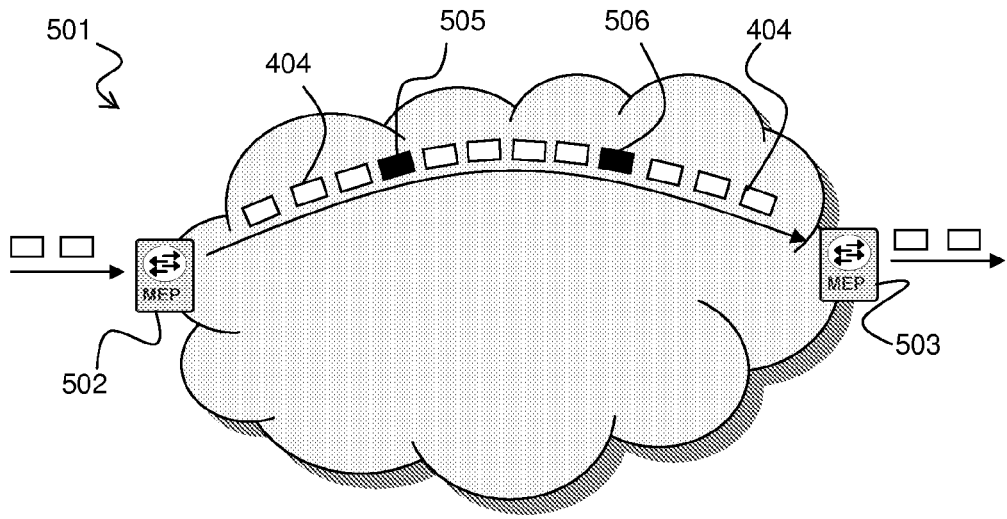
FIG. 5 is a schematic illustration of a provider network with loss measurement OAM frames inserted into the service frame flow.

FIG. 5 illustrates the operation of such an approach. FIG. 5 is a schematic illustration of a network 501, similar to the network 401 shown in FIG. 4, which includes Maintenance End Points (MEPs) 502, 503 at the edges of the network. Service frames 404 corresponding to a multicast service are sent from a source MEP 502 towards a receiving MEP 503. OAM frames 505, 506 are periodically issued by the source MEP 503, and are forwarded on the same path as the service frames 404.

This approach solves the problem of measurement delay caused by OAM frames and service frames following different paths. Furthermore, the problem of loss measurement inaccuracy caused by the different path of service and OAM frames is also avoided. If OAM frames 505, 506 have the same address as the service frames 404, then there is no need for Measurement Indicator frames 407, 408 as shown in FIG. 4. However, as noted above, the use of OAM frames with different addresses is well established and the change to OAM and service frames having the same address is not always desirable (and is not in line with ITU-T Y.1731). Furthermore, in this case the destination address is not directly related to the MEPs. If the OAM frames 505, 506 have the same address as the service frames 404 then they have to be filtered from the service frames 404 by some other means. Such filtering might be based, for example, on EtherType and MEG level.

The first loss measurement result immediately after subscription will also still need to be suppressed in this case as well.

According to ITU-T Y.1731, Loss Measurement (LMM) and Loss Measurement Reply (LMR) OAM messages are used for point to point loss measurement. If the approach suggested with reference to FIG. 4 is implemented, these OAM messages 405, 406 will need to include an identifier to ensure that they are linked to their corresponding measurement indicator messages. This can be achieved by the introduction of a new OAM message, the Multicast Loss Measurement Message (MLMM) and optionally the Multicast Loss Measurement Reply (MLMR), for the multicast loss measurement. Alternatively, the existing Y.1731 LMM and LMR messages could be extended to include the identifier. As discussed above the identifiers may be globally unique, or locally unique. If they are locally unique the multicast service address has to be sent together with the identifier in the loss measurement OAM message 405, 406.

The Loss Measurement Reply OAM message defined in ITU-T Y.1731 includes the counters needed for leaf to root loss measurement. In the multicast case there is no need to include the unicast loss counters to the loss measurement reply. The reply to the multicast loss measurement OAM message can therefore be made optional. If it is used, the multicast loss measurement reply message need only contain the counters for the root to leaf direction.

Figure 8:
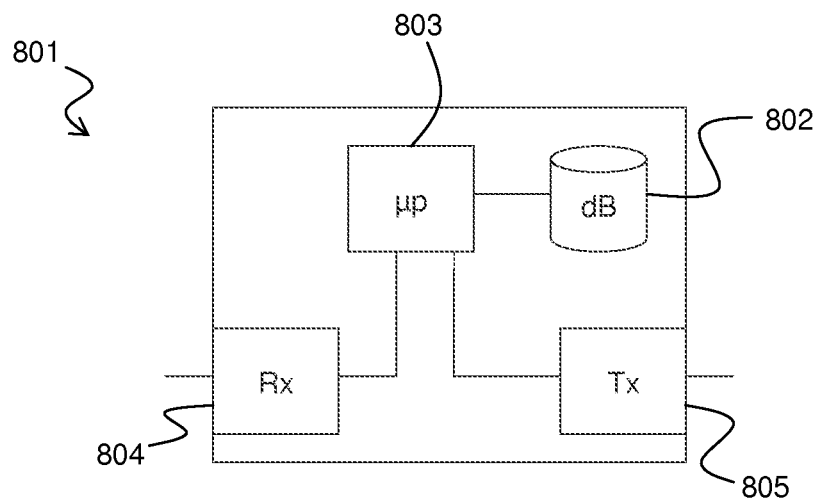
FIG. 8 is a schematic illustration of a bridge node.

FIG. 8 is a schematic illustration of a bridge node 801 that implements the method described above. The bridge node 801 has a memory 802 to store the measurement counters. A processor 803 is provided for the implementation of MEP functions and the described measurement methods. A receiver 804 is provided for receiving service and OAM frames, which instruct the bridge node to invoke certain parts of the measurement method if the bridge node is a destination of the multicast transmission. A transmitter 805 is provided for issuing service and OAM frames to further bridge nodes if the bridge node is a destination of the multicast transmission.

The invention claimed is:

1. A bridge node for use in a network, comprising:
    a receiver for receiving, from a source node in the network, multicast service frames having a service multicast destination address, measurement indicator frames having the service multicast destination address, and loss measurement OAM frames having an OAM destination address different to the service multicast destination address;
    a processor operatively connected to the receiver for performing loss measurements; and
    a memory operatively connected to the processor for storing a received frames counter;
    wherein the processor is arranged:
    to count the number of received service frames and record this using the received frames counter;
    when a loss measurement OAM frame is received, to recover a sent frames counter value from the loss measurement OAM frame, the sent frames counter indicating the number of frames sent by the source node; and
    when a measurement indicator frame corresponding to the loss measurement OAM frame is received, to calculate a number of lost or delayed service frames by comparing the received frames counter value with the sent frames counter value.

2. The bridge node of claim 1, wherein the processor is arranged to establish that the measurement indicator frame and loss measurement OAM frame correspond to each other by reading identifiers from the measurement indicator frame and loss measurement OAM frame.

3. The bridge node of claim 1, further comprising a transmitter operatively connected to the processor for sending a unicast loss reply message towards the source node, the unicast loss reply message containing the results of the loss calculation but not counters to measure loss for packets travelling from the receiving node to the source node.

4. The bridge node of claim 1, wherein the processor is arranged to suppress the calculation of the number of lost or delayed frames after receipt of the first loss measurement OAM frame immediately after the bridge node has subscribed to the multicast service.

5. The bridge node of claim 4, wherein the received frames counter is made equal to the sent frames counter value in the first loss measurement OAM frame received after subscription to the multicast service.

6. The bridge node of claim 4, wherein the processor further maintains a correction counter, which is updated from the counter value in the first loss measurement OAM frame received after subscription to the multicast service, and added to the received frame counter when the loss is calculated.

7. The node of claim 4, wherein the loss is reset to zero for the period in which the bridge node was not subscribed to the multicast transmission.

8. A bridge node for use in a network, comprising:
a processor;
a memory operatively connected to the processor for storing a sent frames counter; and
a transmitter operatively connected to the processor for sending multicast service frames towards a receiving node in the network, the service frames including a service multicast destination address;
wherein the processor is arranged:
to record the number of service frames sent using the sent frames counter;
periodically, to read the sent frames counter from the memory, generate a loss measurement OAM frame having an OAM destination address different to the service multicast destination address and a unique identifier, and copy the sent frames counter into the loss measurement OAM frame; and
each time a loss measurement OAM frame is generated, to generate a measurement indicator frame having the service multicast destination address and the unique identifier;
and wherein the transmitter is arranged to send the loss measurement OAM frame and measurement indicator frame towards the receiving node.

9. The bridge node of claim 8, wherein the processor is arranged to include in the measurement indicator frame an indication of the service frames either side of it.

10. A method of measuring loss in a multicast transmission in a network, comprising:
sending service frames from a source node towards a receiving node, the service frames including a service multicast destination address;
at the source node, maintaining a sent frames counter of the number of service frames sent;
reading the sent frames counter and copying the sent frames counter value into a loss measurement OAM frame;
sending the loss measurement OAM frame from the source node towards the receiving node, the loss measurement OAM frame including a unique identifier and an OAM destination address which is different to the service multicast destination address;
when the sent frames counter is read, sending a measurement indicator frame from the source node towards the receiving node, the measurement indicator frame including the service multicast destination address and the unique identifier so that it can be related to the loss measurement OAM frame, the measurement indicator frame being distinguishable from the service frames;
receiving the loss measurement OAM frame at the receiving node;
receiving the measurement indicator frame at the receiving node;
at the receiving node, calculating the number of lost or delayed service frames by comparing the number of service frames received at the receiving node at the time the measurement indicator frame is received with the sent frames counter value contained in the loss measurement OAM frame;
wherein the calculation is only performed when the loss measurement OAM frame and measurement indicator frame having the same identifier are received by the receiving node.

11. The method of claim 10, wherein the measurement indicator frame is distinguishable from the service frames by being a different type of frame such as an OAM Ethertype.

12. The method of claim 10, wherein the identifier is a globally unique identifier.

13. The method of claim 10, wherein the identifier is locally unique to a particular multicast service, and a multicast service address for the particular multicast service is included in the loss measurement OAM message.

14. The method of claim 10, wherein the network is an Ethernet network.

15. The method of claim 11, wherein the receiving node explicitly informs the source node when it subscribes to the multicast transmission.

16. A program configurable to be executed on a bridge node in a network to be embodied on a non-transitory computer readable medium, the program arranged when executed to:
count the number of multicast service frames received from a source node in the network and record this in a received frames counter;
identify when a loss measurement OAM frame and corresponding measurement indicator frame have both been received at the bridge node;
recover a sent frames counter value from the loss measurement OAM frame; and
calculate a number of lost or delayed service frames by comparing the received frames counter value with the sent frames counter value.

17. A program configurable when executed on a bridge node in a network to be embodied on a non-transitory computer readable medium, the program arranged when executed:
to record a number of multicast service frames sent towards a receiving node in the network using a sent frames counter, the multicast service frames including a service multicast destination address;
periodically to copy the sent frames counter into a loss measurement OAM frame having an OAM destination address and a unique identifier, and send the loss measurement OAM frame towards the receiving node;
each time a loss measurement OAM frame is sent, to generate a measurement indicator frame having the service multicast destination address and the unique identifier and send it towards the receiving node.

* * * * *

UNITED STATES PATENT AND TRADEMARK OFFICE
CERTIFICATE OF CORRECTION

PATENT NO. : 8,879,401 B2  
APPLICATION NO. : 13/383301  
DATED : November 4, 2014  
INVENTOR(S) : Jocha et al.

Page 1 of 1

It is certified that error appears in the above-identified patent and that said Letters Patent is hereby corrected as shown below:

In the Specification

In Column 10, Line 8, delete "(LMM)" and insert -- message (LMM) --, therefor.

In the Claims

In Column 11, Line 26, in Claim 7, delete "node of" and insert -- bridge node of --, therefor.

Signed and Sealed this  
Seventh Day of April, 2015

Michelle K. Lee  
*Director of the United States Patent and Trademark Office*